United States Patent
Rastogi et al.

(10) Patent No.: US 7,327,111 B2
(45) Date of Patent: Feb. 5, 2008

(54) SYSTEM AND METHOD FOR PARALLEL CONTROL OF VARIABLE FREQUENCY DRIVES

(75) Inventors: Mukul Rastogi, Murrysville, PA (US); Ronald Gaillot, Lower Burrell, PA (US); Anthony C. Schneider, Monroeville, PA (US); Ralph Flaugher, Jr., Allison Park, PA (US); Yusuke Fukuta, Pittsburgh, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/503,327

(22) Filed: Aug. 11, 2006

(65) Prior Publication Data

US 2007/0035263 A1  Feb. 15, 2007

Related U.S. Application Data

(60) Provisional application No. 60/708,066, filed on Aug. 12, 2005.

(51) Int. Cl.
  *H02P 7/00* (2006.01)
(52) U.S. Cl. .................. 318/432; 363/65; 318/807; 187/293

(58) Field of Classification Search .................. 363/41; 318/807, 432, 254, 119; 187/293
See application file for complete search history.

(56) References Cited

U.S. PATENT DOCUMENTS 5,460,244 A * 10/1995 Tanahashi .................... 187/293
6,107,774 A *  8/2000 Yamada et al. .............. 318/807
6,160,725 A * 12/2000 Jansen ........................ 363/65

\* cited by examiner

*Primary Examiner*—Lincoln Donovan
*Assistant Examiner*—Antony Paul

(57) ABSTRACT

A method for controlling at least two variable frequency drives connected in parallel. The method comprises, for each variable frequency drive, communicating a magnetizing current component value to a master controller, and receiving a speed demand, a flux demand, and an average magnetizing current component value from the master controller. The method also comprises determining a motor speed and a motor flux based on measurements of a stator voltage and current of a motor coupled to the variable frequency drive, determining a speed reference based on a torque current component value, and determining a flux reference based on the magnetizing current component value and the average magnetizing current component value. The method further comprises adjusting a torque current component based on the speed reference and/or adjusting a magnetizing current component based on the flux reference.

20 Claims, 5 Drawing Sheets

SYSTEM AND METHOD FOR PARALLEL CONTROL OF VARIABLE FREQUENCY DRIVES

CROSS-REFERENCE TO RELATED APPLICATIONS

This application claims the priority benefit of U.S. Provisional Patent Application No. 60/708,066, filed on Aug. 12, 2005.

BACKGROUND

This application discloses an invention that is related, generally and in various embodiments, to a system and method for parallel control of variable frequency drives.

Variable frequency drives are known in the art. A variable frequency drive typically includes a control circuit and a power circuit. For synchronous motor applications, the variable frequency drive may also include a field supply. The control circuit controls the operation of the power circuit and, for synchronous motor applications, also enables/disables the associated field supply. The power circuit includes a rectifier and an inverter, and provides power to a winding of a motor connected to the variable frequency drive. For synchronous motor applications, the field supply provides power to an exciter for a motor field circuit.

The control circuit typically includes a speed regulator, a flux regulator, a magnetizing current regulator, a torque current regulator, a DQ-3Φ transform, a pulse width modulator, and a motor model. The speed regulator provides a magnetizing current reference, and the flux regulator provides a torque current reference. The control circuit compares the magnetizing current reference to a measured magnetizing current, and the magnetizing current regulator determines a Q-axis voltage reference. The control circuit also compares the torque current reference to a measured torque current, and the torque current regulator determines a D-axis voltage reference. Additional feed-forward signals may be added to the D-axis voltage reference and the Q-axis voltage reference to provide a higher dynamic response. The DQ-3Φ transform transforms the Q-axis voltage reference and the D-axis voltage reference from two-phase information into three-phase values. The pulse width modulator converts the three-phase values to switching commands that are sent to the power circuit. The motor model generally utilizes measured voltage and/or current signals to determine motor parameters such as the motor speed, the motor flux, the motor flux angle. For applications where low cost is a business requirement, the motor model may only utilize the variable frequency drive output current or the motor current to determine motor parameters. The motor model also converts measured currents into a magnetizing current component and a torque current component for use in the magnetizing current regulator and the torque current regulator, respectively.

Many of the functions performed by the control circuit are implemented in software. The software is written such that calculations are done at two or more different rates so as to save processor execution time. In general, the pulse width modulator operates at the fastest rate and is usually implemented in hardware. The magnetizing current regulator, the torque current regulator, and the DQ-3Φ transform blocks are typically executed at a data rate of 1-10 kilohertz so that a fast response of the control is achieved in limiting the output current of the variable frequency drive in case of sudden changes in the load or the output circuit. The speed regulator and the flux regulator typically operate at a slower rate of 100-1000 hertz because both motor speed and motor flux change at a much slower rate than the magnetizing current and the torque current. The motor model also is usually computed at this rate. Communications from the control circuit to the outside world, which includes communications to an external device (from the customer), is typically at a rate of 1-10 hertz.

When the power needed to be delivered to a load exceeds the power available from a single variable frequency drive, it is known to connect a number of variable frequency drives in parallel in order to meet the power requirement of the load. To control such parallel arrangements, a master-slave arrangement is often utilized. In a master-slave configuration, a master controller often operates as an interface between external controls (e.g., customer controls) and the various variable frequency drives. The respective control circuits communicate with the master controller and also communicate directly with each other.

In general, for the master-slave arrangement, one variable frequency drive is configured as the master drive, and the other variable frequency drives are configured as slave drives. The master drive typically performs the speed regulator function and the flux regulator function, and issues current commands (torque current reference and magnetizing current reference) to itself and all the slave drives. The slave drives operate on current commands from the master drive and do not utilize their respective speed regulators or flux regulators. Thus, the slave drives operate with fewer regulators than the master drive. The slave drives utilize the current commands from the master drive to regulate each of their output currents and produce the required motor voltage. In addition to the current commands, the master drive must also send either the motor flux angle or the motor frequency information to the slave drives to enable the slave drives to convert the respective Q-axis voltage references and D-axis reference voltages to the correct 3-phase reference frame. To provide good dynamic performance, the required communication rate between the master drive and the slave drives is in the range of 100-1000 hertz. The master controller is required to have knowledge of the master drive so that a slave drive can be configured as the new master drive in case the original master drive needs to be removed from the system.

For proper operation, each variable frequency drive is required to know its position in the system (either master or slave) and is required to operate differently based on its position. As the master drive performs more tasks than the slave drives, the control of the master drive is more complex than the control of the slave drives. Although the master-slave configuration works well for a number of different applications, the master-slave configuration tends to be relatively complex and relatively expensive to implement.

SUMMARY

In one general respect, this application discloses a system for parallel control of variable frequency drives. According to various embodiments, the system comprises a master controller, and at least two independent variable frequency drives in communication with the master controller. Each variable frequency drive comprises a power circuit, and a controller in communication with the power circuit. The controller comprises a speed droop module and a flux share module. The speed droop module is structured and arranged to regulate a torque current component in the variable frequency drive. The flux share module is structured and arranged to regulate a magnetizing current component in the variable frequency drive.

In another general respect, this application discloses a method for parallel control of variable frequency drives. According to various embodiments, the method comprises, for each variable frequency drive, communicating a magnetizing current component value to a master controller, and receiving a speed demand, a flux demand, and an average magnetizing current component value from the master controller. The method also comprises determining a motor speed and a motor flux based on measurements of a stator voltage and current of a motor coupled to the variable frequency drive, determining a speed reference based on a torque current component value, and determining a flux reference based on the magnetizing current component value and the average magnetizing current component value. The method further comprises adjusting a torque current component based on the speed reference and/or adjusting a magnetizing current component based on the flux reference.

Aspects of the invention may be implemented by a computing device and/or a computer program stored on a computer-readable medium. The computer-readable medium may comprise a disk, a device, and/or a propagated signal.

DESCRIPTION OF DRAWINGS

Various embodiments of the invention are described herein by way of example in conjunction with the following figures.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 1:
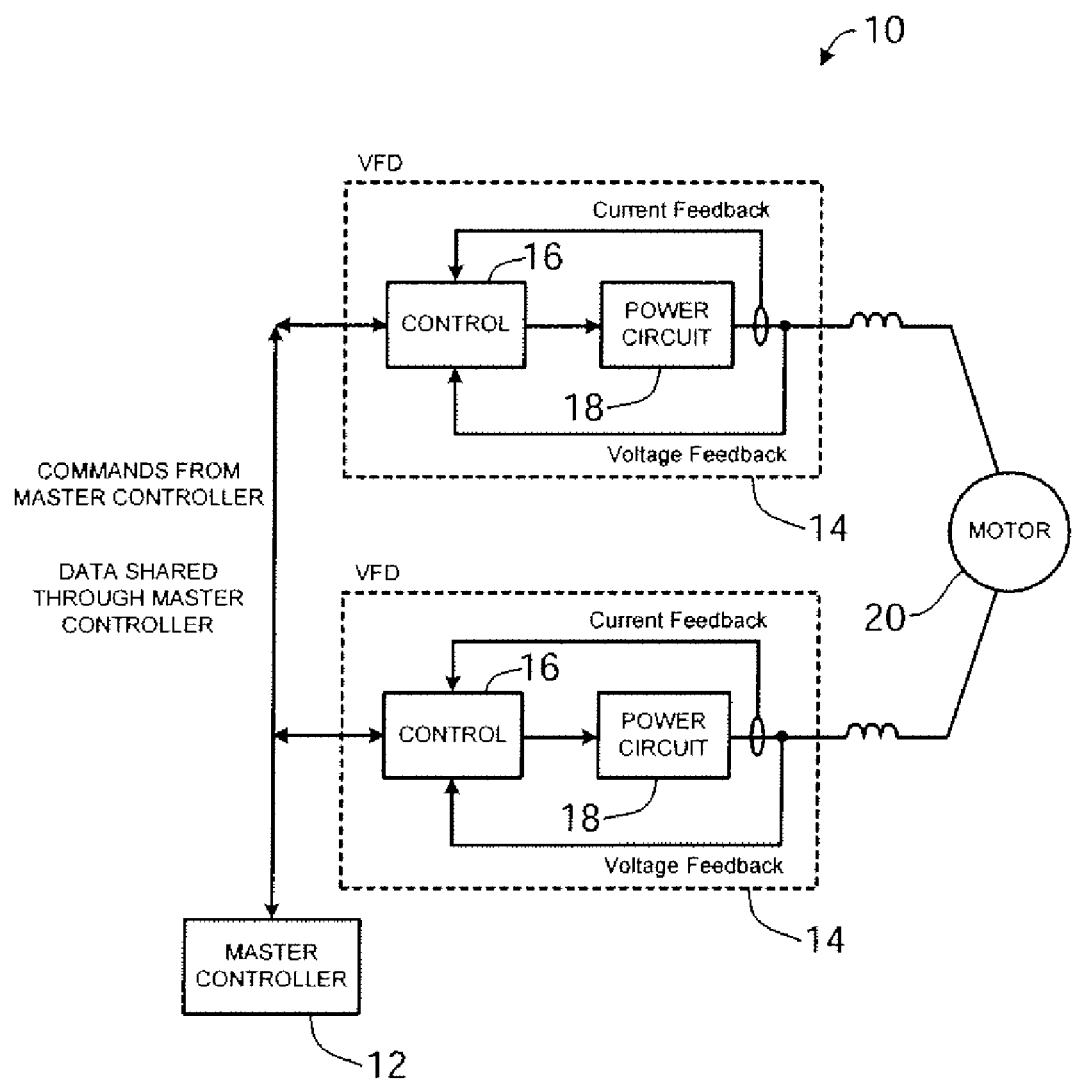
FIG. 1 illustrates various embodiments of a system for parallel control of variable frequency drives.

FIG. 1 illustrates various embodiments of a system 10 for parallel control of variable frequency drives. The system 10 comprises a master controller 12, and independent variable frequency drives 14 in communication with the master controller 12. Although only two variable frequency drives 14 are shown in FIG. 1, one skilled in the art will appreciate that the system 10 may comprise any number of variable frequency drives 14.

The master controller 12 may be embodied as one or more programmable logic controllers, and may serve as the interface between other controls (e.g., customer controls) and the variable frequency drives 14. The master controller 12 is structured and arranged to communicate with the variable frequency drives 14 at a data rate that is substantially less than any computation rate within the variable frequency drives 14. As described in more detail hereinbelow, satisfactory current sharing between the variable frequency drives 14 may be realized with a data communication rate on the order of approximately 1-10 hertz, which is substantially less than any computation rate within the variable frequency drives 14. The master controller 12 may send commands such as speed and flux demands and start or stop requests to each of the variable frequency drives 14. Responsive thereto, each variable frequency drive 14 may send status information (e.g., healthy or faulted) and feedback information (e.g., output current, voltage and frequency) to the master controller 12.

Each variable frequency drive 14 comprises a controller 16 in communication with the master controller 12, and a power circuit 18 in communication with the controller 16. Each power circuit 18 is coupled to a winding of a motor 20. According to various embodiments, each power circuit 18 may be coupled to a different winding of a multi-winding alternating current motor, to the same winding of a single winding alternating current motor, or any combination thereof. One skilled in the art will appreciate that the system 10 may be utilized with any type of alternating current motor such as a synchronous motor, an induction motor, or a permanent magnet motor. For synchronous motor applications, each variable frequency drive 14 may also include a field supply that is enabled/disabled by the controller 16, and each field supply may be connected to an exciter for a motor field circuit as is known in the art. As shown in FIG. 1, for each variable frequency drive 14, a voltage output by the associated power circuit 18 is fed back to the associated controller 16 and a current output by the associated power circuit 18 is also fed back to the associated controller 16.

Figure 2:
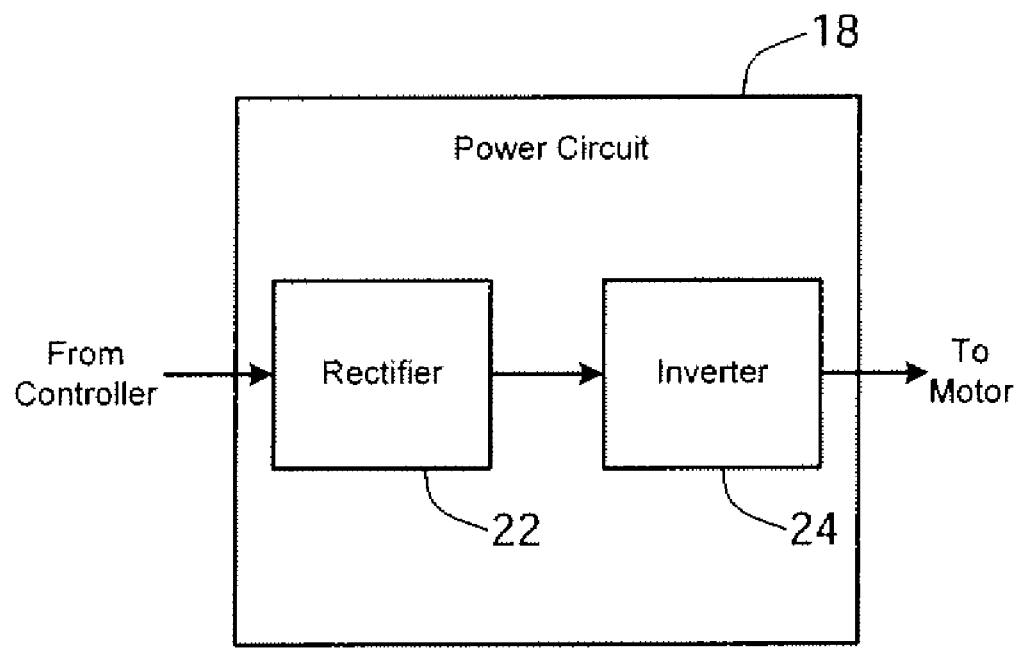
FIG. 2 illustrates various embodiments of a power circuit of one of the variable frequency drives of the system of FIG. 1.

The variable frequency drives 14 do not communicate directly with each other. Each variable frequency drive 14 is structured and arranged to communicate with the master controller 12 at a data rate that is substantially less than any computation rate within the variable frequency drives 14 (e.g., approximately one to ten hertz). The relatively low data rate allows for the system 10 to be simpler and less expensive than systems utilizing master/slave arrangements. The system 10 may be utilized with any type of alternating current motor FIG. 2 illustrates various embodiments of a power circuit 18 of the system 10. The power circuit 18 is representative of the power circuits 18 of each of the variable frequency drives 14. The power circuit 18 comprises a rectifier 22 and an inverter 24 connected to the rectifier 22. The rectifier 22 is connected to the controller 16, and the inverter 24 is connected to a winding of the motor 20. According to various embodiments, the inverter 24 may comprise any number of switching devices such as, for example, insulated gate bipolar transistors, integrated gate commutating thyristors, MOSFETs, etc.

Figure 3:
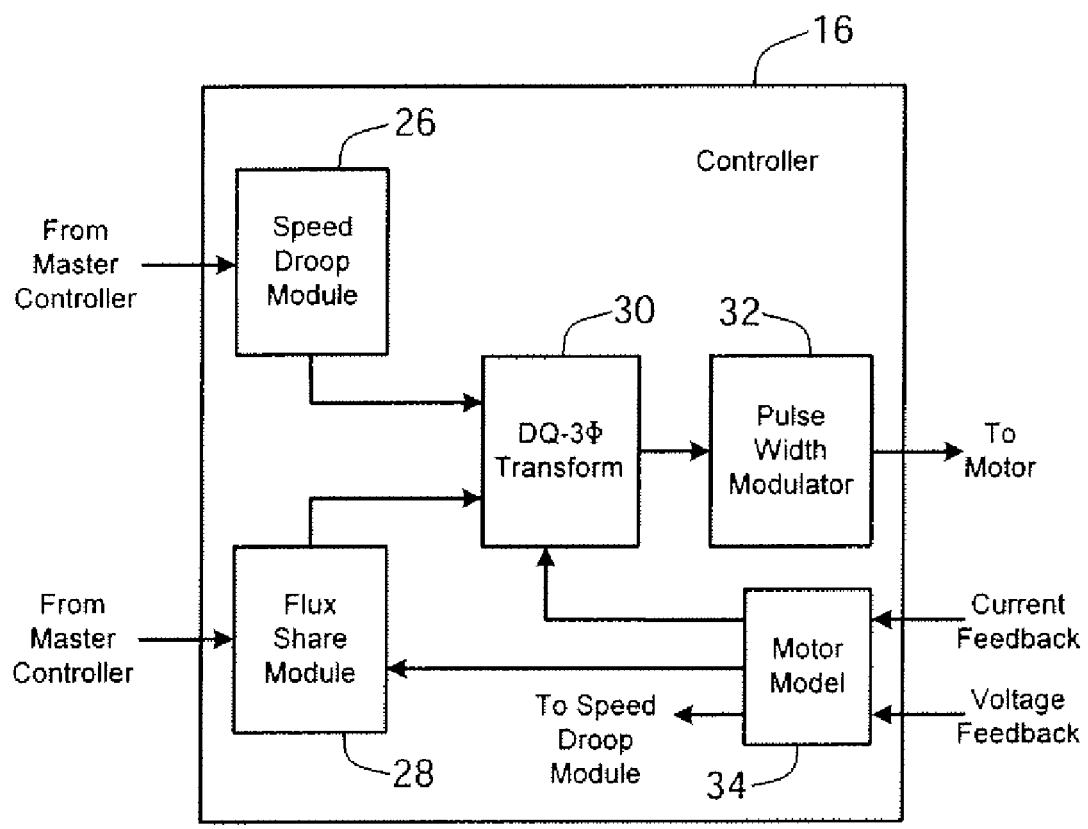
FIG. 3 illustrates various embodiments of a controller of one of the variable frequency drives of the system of FIG. 1.

FIG. 3 illustrates various embodiments of a controller 16 of the system 10. The controller 16 is representative of the controllers 16 of each of the variable frequency drives 14. The controller 16 comprises a speed droop module 26 and a flux share module 28. The controller 16 also comprises a DQ-3Φ transform 30, a pulse width modulator 32, and a motor model 34. According to various embodiments, the motor model 34 is structured and arranged to determine a motor speed estimate and a motor flux estimate based on stator voltage and stator current measurements. The motor model 34 may also provide values for a magnetizing current component, a torque current component, and motor flux angle.

Figure 4:
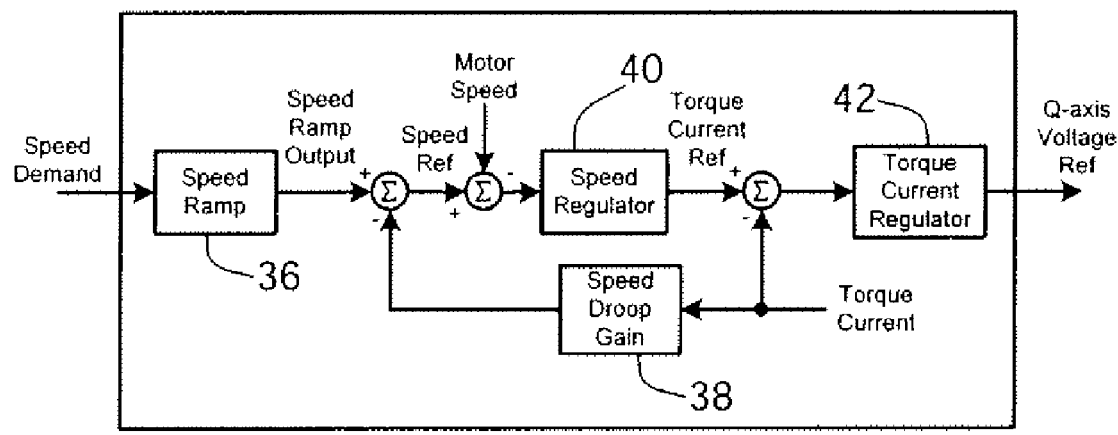
FIG. 4 illustrates various embodiments of a speed droop module of the controller of FIG. 3.

FIG. 4 illustrates various embodiments of a speed droop module 26 of the system 10. The speed droop module 26 is representative of the speed droop modules 26 of each of the variable frequency drives 14. The speed droop module 26 is structured and arranged to regulate a torque current component in the associated variable frequency drive 14. The speed droop module 28 comprises a speed ramp 36, a speed droop gain 38, a speed regulator 40, and a torque current regulator 42. In operation, the speed ramp 36 receives a speed demand from the master controller 12, and linearizes any change in the speed demand to a rate that is adjustable by a user. The speed droop gain 38 scales a torque current component value, and the scaled torque current component value is subtracted from the output of the speed ramp 36 to form the speed reference for the speed regulator 40. Thus, the speed droop module 26 is also structured and arranged to determine a speed reference based on the torque current component value. The introduction of torque current into the speed reference promotes torque current sharing by the variable frequency drives 14.

According to other embodiments, the speed droop module 26 may be structured and arranged such that the speed droop gain 38 scales the torque current reference instead of the torque current component value. For such embodiments, the speed reference for the speed regulator 40 is formed by subtracting the scaled torque current reference from the output of the speed ramp 36.

When one of the variable frequency drives 14 is delivering more torque current than the other variable frequency drives 14, the speed droop module 26 operates to subtract a larger torque current component value from the output of the speed ramp 36. This action leads to the variable frequency drive 14 reducing its output frequency for a period of time until the phase shift between its output voltage and the back-emf of the motor 20 is reduced to a desired value. As there is a direct relationship between torque current and the phase angle between the output voltage of the variable frequency drive 14 and the back-emf of the motor 20, the reduced phase angle results in less torque current being delivered by the variable frequency drive 14. The other variable frequency drives 14, which have a smaller torque current component value being subtracted from the respective outputs of their speed ramps 36, are able to increase their output frequency, thereby allowing them to deliver more torque current such that all of the variable frequency drives 14 are delivering substantially the same amount of torque current.

Figure 5:
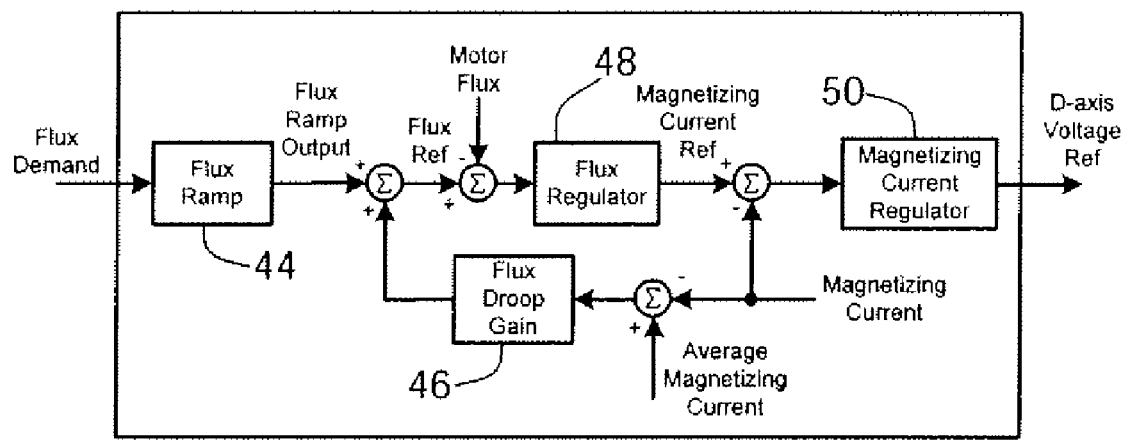
FIG. 5 illustrates various embodiments of a flux share module of the controller of FIG. 3.

FIG. 5 illustrates various embodiments of a flux share module 28 of the system 10. The flux share module 28 is representative of the flux share modules 28 of each of the variable frequency drives 14. The flux share module 28 is structured and arranged to regulate a magnetizing current component in the associated variable frequency drive 14. The flux share module 28 comprises a flux ramp 44, a flux droop gain 46, a flux regulator 48, and a magnetizing current regulator 50. In operation, the flux ramp 44 receives a flux demand from the master controller 12, and linearizes any change in the flux demand to a rate that is adjustable by a user. The flux droop gain 46 scales an error between an average magnetizing current component value provided by the master controller 12 and an output of the flux regulator 48. The average magnetizing current component value is determined by the master controller 12 based on the magnetizing current component value reported by each of the variable frequency drives 14. The output of the flux regulator 48 is the magnetizing current reference. The scaled error is added to the output of the flux ramp 44 to form the flux reference for the flux regulator 48. Thus, the flux share module 28 is also structured and arranged to determine a flux reference based on the magnetizing current component value. The introduction of magnetizing current error into the flux reference serves to have the variable frequency drives 14 operate with a minimum error on the magnetizing current components, thereby promoting magnetizing current sharing by the variable frequency drives 14.

When one of the variable frequency drives 14 is delivering a magnetizing current that is greater than the average magnetizing current component value provided by the master controller 12, the flux share module 28 operates to add the scaled error to the output of the flux ramp 44, effectively reducing the value of the flux reference. The reduction in the flux reference causes the flux regulator 48 to lower the magnetizing current reference, which in turn decreases the magnetizing current due to the action of the magnetizing current regulator 50. When one of the variable frequency drives 14 is delivering a magnetizing current that is less than the average magnetizing current component value provided by the master controller 12, the opposite occurs. Thus, all of the variable frequency drives 14 may be controlled to deliver substantially the same amount of magnetizing current.

According to other embodiments, the flux share module 28 may be structured and arranged such that the flux droop gain 46 scales an error between an average magnetizing current reference provided by the master controller 12 and an output of the flux regulator 48. The average magnetizing current reference may be determined by the master controller 12 based on the respective magnetizing current reference reported by each of the variable frequency drives 14. For such embodiments, the flux reference for the flux regulator 48 is formed by adding the scaled error to the output of the flux ramp 44.

According to yet other embodiments, the flux share module 28 may be structured and arranged such that the output of the flux regulator 48 is utilized as the reference for the field supply current when the motor 20 is a synchronous motor. An error between the average field supply current and the actual field supply current may be utilized to effect a change in the flux reference. For such embodiments, the magnetizing current reference becomes a fixed value that is used in all of the variable frequency drives 14. The fixed value may be, for example, zero, or a value which is equal to the output of a proportional regulator portion of the flux regulator 48.

While several embodiments of the invention have been described herein by way of example, those skilled in the art will appreciate that various modifications, alterations, and adaptations to the described embodiments may be realized without departing from the spirit and scope of the invention defined by the appended claims.

What is claimed is:

1. A system, comprising:
   a master controller; and
   at least two independent variable frequency drives in communication with the master controller, wherein each variable frequency drive comprises:
   a power circuit; and
   a controller in communication with the power circuit, wherein the controller comprises:
   a speed droop module that is structured and arranged to regulate a torque current component in the variable frequency drive; and a flux share module that is structured and arranged to regulate a magnetizing current component in the variable frequency drive.

2. The system of claim 1, wherein the master controller is structured and arranged to communicate with each variable frequency drive at a data rate that is substantially less than any computation rate within the variable frequency drives.

3. The system of claim 1, wherein the master controller comprises a programmable logic controller.

4. The system of claim 1, wherein each power circuit comprises:
a rectifier; and an inverter connected to the rectifier.

5. The system of claim 4, wherein the inverter comprises at least one of the following switching devices:
an insulated gate bipolar transistor;
an integrated gate commutating thyristor; and
a MOSFET.

6. The system of claim 1, wherein the speed droop module is structured and arranged to determine a speed reference signal based on the torque current component.

7. The system of claim 1, wherein the flux droop module is structured and arranged to determine a flux reference signal based on the magnetizing current component.

8. The system of claim 1, wherein the torque current component is substantially equal to a torque current component in another variable frequency drive of the system.

9. The system of claim 1, wherein the magnetizing current component is substantially equal to a magnetizing current component in another variable frequency drive of the system.

10. The system of claim 1, wherein each controller further comprises a motor model module that is structured and arranged to determine a motor speed estimate and a motor flux estimate based on stator voltage and stator current measurements.

11. The system of claim 1, wherein each variable frequency drive further comprises a field supply coupled to the controller.

12. A method for controlling at least two variable frequency drives connected in parallel, the method comprising:
for each variable frequency drive,
communicating a magnetizing current component value to a master controller;
receiving a speed demand, a flux demand, and an average magnetizing current component value from the master controller;
determining a motor speed and a motor flux based on measurements of a stator voltage and current of a motor coupled to the variable frequency drive;
determining a speed reference based on a torque current component value;
determining a flux reference based on the magnetizing current component value and the average magnetizing current component value; and
adjusting at least one of the following:
a torque current component based on the speed reference; and
a magnetizing current component based on the flux reference.

13. The method of claim 12, wherein communicating the magnetizing current component value comprises communicating the magnetizing current component value at a data rate that is substantially less than any computation rate within the variable frequency drives.

14. The method of claim 12, wherein receiving the speed demand, the flux demand, and the average magnetizing current component value comprises receiving the speed demand, the flux demand, and the average magnetizing current component value at a data rate that is substantially less than any computation rate within the variable frequency drives.

15. The method of claim 12, wherein determining the speed reference comprises:
scaling the torque current component value; and
subtracting the scaled torque current component value from an output of a speed ramp.

16. The method of claim 12, wherein determining the flux reference comprises:
determining a difference between the magnetizing current component value and the average magnetizing current component value;
scaling the difference; and
adding the scaled value to an output of a flux ramp.

17. The method of claim 12, wherein adjusting the torque current component comprises adjusting a phase shift between an output voltage of the variable frequency drive and a back-emf of a motor connected thereto.

18. The method of claim 17, wherein adjusting the phase shift comprises adjusting the output frequency of the variable frequency drive.

19. The method of claim 12, wherein adjusting the torque current component comprises adjusting the torque current component to be substantially equal to a torque current component in another variable frequency drive connected in parallel.

20. The method of claim 12, wherein adjusting the magnetizing current component comprises adjusting the magnetizing current component to be substantially equal to a magnetizing current component in another variable frequency drive connected in parallel.

* * * * *